(12) United States Patent
Yi et al.

(10) Patent No.: US 12,267,605 B2
(45) Date of Patent: Apr. 1, 2025

(54) PIXEL ARCHITECTURE WITH MULTIPLE PIXEL BINNING

(71) Applicant: Fairchild Imaging, Inc., San Jose, CA (US)

(72) Inventors: Xianmin Yi, Menlo Park, CA (US); Alexander Lu, San Jose, CA (US)

(73) Assignee: FAIRCHILD IMAGING, INC., San Jose, CA (US)

( * ) Notice: Subject to any disclaimer, the term of this patent is extended or adjusted under 35 U.S.C. 154(b) by 178 days.

(21) Appl. No.: 17/967,028

(22) Filed: Oct. 17, 2022

(65) Prior Publication Data

US 2024/0129644 A1    Apr. 18, 2024

(51) Int. Cl.
*H04N 25/46*    (2023.01)
*H04N 25/71*    (2023.01)
*H04N 25/75*    (2023.01)
*H04N 25/77*    (2023.01)

(52) U.S. Cl.
CPC ............. *H04N 25/46* (2023.01); *H04N 25/71* (2023.01); *H04N 25/75* (2023.01); *H04N 25/77* (2023.01)

(58) Field of Classification Search
CPC ........ H04N 25/46; H04N 25/71; H04N 25/75; H04N 25/77
See application file for complete search history.

(56) References Cited

U.S. PATENT DOCUMENTS

| 7,075,049 | B2 | 7/2006 | Rhodes et al. |
| 7,420,154 | B2 | 9/2008 | Shah |
| 7,442,910 | B2 | 10/2008 | Fossum |
| 7,518,645 | B2 | 4/2009 | Farrier |
| 7,623,169 | B2 | 11/2009 | Apte |
| 7,705,900 | B2 | 4/2010 | Guidash |
| 7,830,437 | B2 | 11/2010 | McKee et al. |
| 8,426,796 | B2 | 4/2013 | Mao et al. |
| 8,704,926 | B2 | 4/2014 | Schemmann et al. |
| 8,896,733 | B2 | 11/2014 | Solhusvik |
| 9,041,842 | B2 | 5/2015 | Willassen |

(Continued)

OTHER PUBLICATIONS

Mizuno, et al., "A Double Transfer 8.0μm Pixel with High Conversion Gain and Pixel Binning," International Image Sensor Society, 2021 Papers, R52. pp. 328-331.

(Continued)

*Primary Examiner* — Nhan T Tran
(74) *Attorney, Agent, or Firm* — Panitch Schwarze Belisario & Nadel LLP

(57) ABSTRACT

Structures are disclosed for a binned set of two or more pixels of a pixel array that share a same readout circuit. The binned pixel design provides space-saving benefits on the chip and also improves the overall image quality. According to some embodiments, each of the binned pixels includes a photodetector and its own transfer gate. The readout circuit is coupled to the transfer gates of each of the binned pixels and includes its own second transfer gate that separates the pixels from a gain mode select block. The gain mode select block may include capacitors of different sizes and one or more switches to control which capacitors are to receive the charge from any one of the binned pixels. The readout circuit may also include a potential barrier (such as a diode), which allows for pumping charge onto the one or more capacitors of the gain mode select block.

14 Claims, 6 Drawing Sheets

(56) References Cited

U.S. PATENT DOCUMENTS

| | | |
|---|---|---|
| 9,106,851 B2 | 8/2015 | Fenigstein et al. |
| 9,167,182 B2 | 10/2015 | Parks |
| 9,402,039 B2 | 7/2016 | Solhusvik et al. |
| 9,584,745 B2 | 2/2017 | Ladd |
| 9,729,808 B2 | 8/2017 | Fenigstein et al. |
| 9,807,323 B2 | 10/2017 | Ganguly et al. |
| 9,843,738 B2 | 12/2017 | Cremers et al. |
| 9,888,191 B2 | 2/2018 | Beck |
| 9,942,502 B2 | 4/2018 | Borremans |
| 10,171,760 B2 | 1/2019 | Otaka |
| 10,362,255 B2 | 7/2019 | Johnson et al. |
| 10,498,991 B2 | 12/2019 | Van Der Tempel |
| 10,560,646 B2 | 2/2020 | Milkov et al. |
| 10,574,913 B2 | 2/2020 | Douence et al. |
| 10,638,066 B2 | 4/2020 | Kobayashi et al. |
| 10,741,592 B2 | 8/2020 | Innocent |
| 10,785,425 B2 | 9/2020 | Winzenread |
| 10,785,430 B2 | 9/2020 | Ikuma et al. |
| 11,089,253 B2 | 8/2021 | Shim et al. |
| 11,258,977 B2 | 2/2022 | Lule |
| 11,343,439 B2 | 5/2022 | Johnson |
| 2007/0023798 A1* | 2/2007 | McKee .................. H04N 25/77 348/E3.018 |
| 2007/0035649 A1 | 2/2007 | McKee |
| 2007/0285545 A1 | 12/2007 | Hsieh |
| 2008/0136933 A1 | 6/2008 | Dosluoglu et al. |
| 2008/0156966 A1 | 7/2008 | Hsieh |
| 2009/0237540 A1 | 9/2009 | Johnson |
| 2010/0044552 A1 | 2/2010 | Chen |
| 2010/0149392 A1* | 6/2010 | Hara ................... H04N 25/445 348/300 |
| 2012/0241591 A1* | 9/2012 | Wan .................. H01L 27/14654 250/214.1 |
| 2016/0150174 A1 | 5/2016 | Hynecek |
| 2018/0048841 A1 | 2/2018 | Hynecek |
| 2018/0130839 A1* | 5/2018 | Mauritzson .......... H04N 25/771 |
| 2020/0205680 A1 | 7/2020 | Boukhayma et al. |
| 2021/0151485 A1* | 5/2021 | Ma ..................... H04N 25/778 |
| 2021/0289157 A1* | 9/2021 | Ha ..................... H04N 25/745 |

OTHER PUBLICATIONS

International Search Report, PCT/US23/34342, mailed Feb. 1, 2024, 10 pages.

\* cited by examiner

PIXEL ARCHITECTURE WITH MULTIPLE PIXEL BINNING

BACKGROUND

Image sensors are widely used for a number of different applications across a large portion of the electromagnetic spectrum. Many image sensor designs use an array of sensors to capture light across a given area. Each sensor may be considered a single pixel of the sensor array, with the pixels arranged in any number of rows and columns. Each pixel includes some form of photodetector as well as a circuit to collect the charge from the photodetector in response to a light input. A number of non-trivial issues exist with regard to the design of the circuit to provide both a high dynamic range and a high conversion gain.

Figure 1:
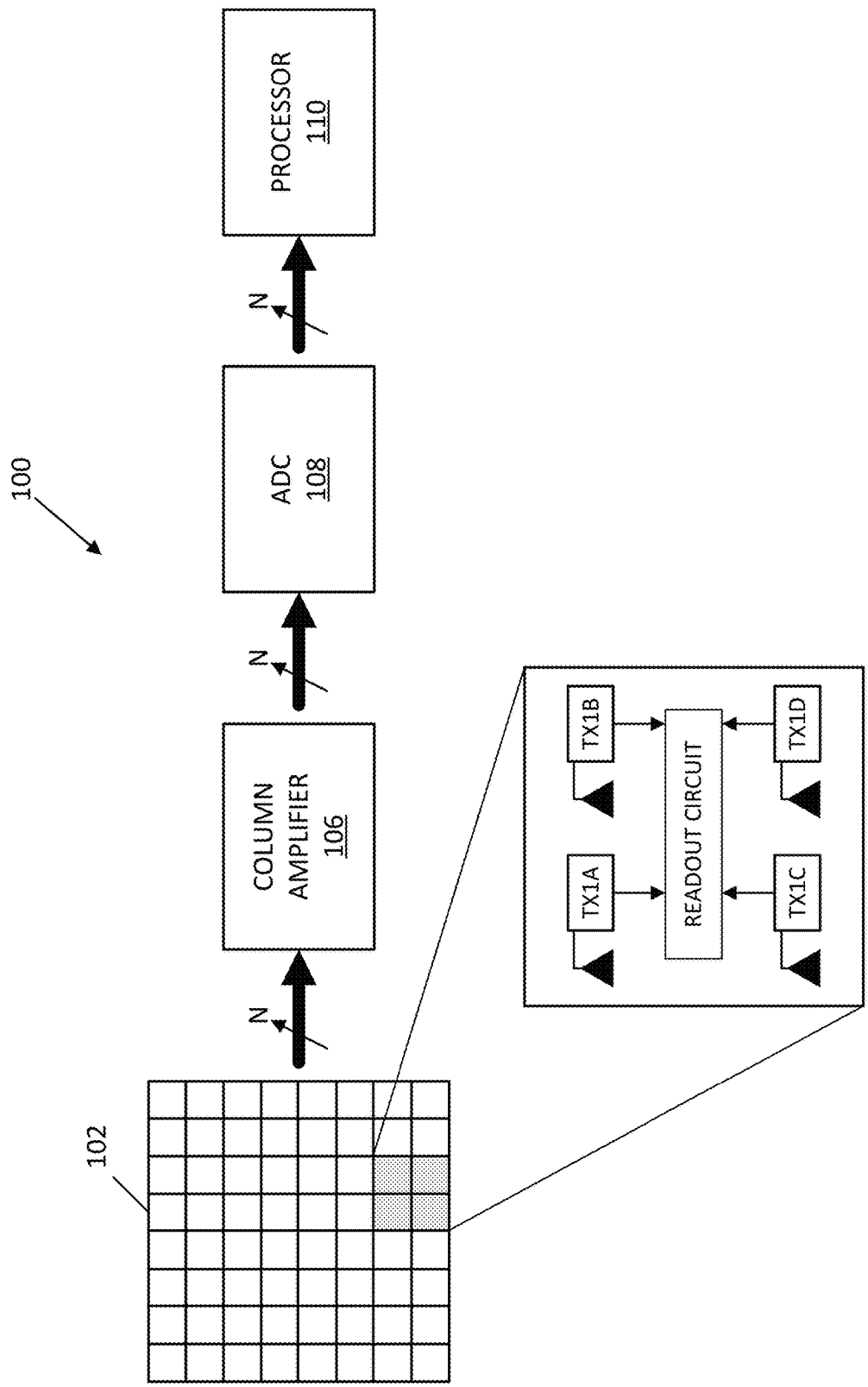
FIG. 1 is a block diagram of an image sensor that uses a pixel array, in accordance with an embodiment of the present disclosure.

These and other features of the present embodiments will be understood better by reading the following detailed description, taken together with the figures herein described.

DETAILED DESCRIPTION

Structures are disclosed for a binned set of pixels (such as a 2×2 set of pixels) of a pixel array that share a same readout circuit. The binned pixel design provides space-saving benefits on the chip and also improves the overall image quality. According to some embodiments, each of the binned pixels includes a photodetector and its own transfer gate. The readout circuit is coupled to the transfer gate of each of the binned pixels and includes its own second transfer gate that separates the pixels from a gain mode select block. The gain mode select block may include capacitors of different sizes and one or more switches to control which capacitors are to receive the charge from any one of the binned pixels. Depending on the state(s) of the one or more switches, different conversion gains can be selected to increase the dynamic range of the pixels. The readout circuit may also include a potential barrier (such as a diode), which allows for pumping charge onto the one or more capacitors of the gain mode select block. The photodetector signal can be amplified via a source follower component and ultimately read out to a column amplifier.

General Overview

As previously noted, there a number of non-trivial issues that remain with respect to designing pixel arrays for an image sensor. For example, the charge from each pixel needs to be read out using a readout circuit having a given conversion gain. When thousands of pixels are used in an array, this can pose a problem for fitting the elements required for so many readout circuits, especially when using capacitors to adjust conversion gain as variously described herein, given that capacitors tend to take up a relatively large amount of space on chip.

Thus, and in accordance with an embodiment of the present disclosure, techniques are disclosed for designing a pixel array having binned pixels that share a common readout circuit. The sensor array of pixels may be, for example, any type of charge coupled device (CCD) designed to receive light for the purpose of generating an image from the light received across the sensor array, although other pixel-based imaging arrays may also benefit. The pixels may be binned, for instance, in a 2×2 array, although other arrangements can be used as well. Furthermore, more than four pixels may be binned together with a common readout circuit, although four is used as an example throughout this disclosure. Each pixel may have its own photodetector and its own transfer gate (e.g., a collection of first transfer gates), while the readout circuit includes a single second transfer gate to pass charge from any of the binned pixels to a sensing node.

According to some embodiments, the sensing node in the readout circuit is configured to be coupled to one or more different capacitors based on the state of one or more switches within the readout circuit. Changing which capacitors are used to store charge from the sensing node provides a different conversion gain for the charge read from the photodetector based on the total capacitance coupled to the sensing node, according to some embodiments. For any selected conversion gain, the charge received from a given photodetector of the binned pixels may be used to generate a current signal that is ultimately fed to a column amplifier or other amplifier element before being converted into a digital signal via an analog-to-digital converter (ADC).

According to some embodiments, a potential barrier may be coupled to an output of the second transfer gate of the readout circuit (such as between the output of the second transfer gate and a ground potential). The inclusion of the potential barrier allows for the second transfer gate to act as a pump gate to pump charge onto the sensing node. According to some embodiments, the readout circuit with or without the potential barrier operates in a first mode where the second transfer gate provides a single on/off transfer of charge to the sensing node, and the readout circuit with the potential barrier operates in a second mode where the transfer gate can pump charge any number of times onto the sensing node. A PN diode is one example of a potential barrier.

According to an example embodiment, a CCD includes at least two pixels with each pixel of the at least two pixels including a photodetector and a corresponding first transfer gate coupled to the photodetector, a second transfer gate having an input coupled to an output of each first transfer gate of each of the at least two pixels, a potential barrier coupled to an output of the second transfer gate, and a capacitor coupled to the output of the second transfer gate. In some embodiments, the CCD includes a second capacitor and a switch coupled between the output of the second transfer gate and the second capacitor. The potential barrier may be a PN diode.

According to another example embodiment, an image sensor includes a pixel array having at least one column of addressable pixels, a readout circuit, a column amplifier coupled to the readout circuit, an analog-to-digital converter (ADC) coupled to the column amplifier, and a processor coupled to the ADC. The at least one column of addressable pixels includes at least two pixels with each pixel of the at least two pixels including a photodetector and a corresponding first transfer gate coupled to the photodetector. The readout circuit includes a second transfer gate having an input coupled to an output of each first transfer gate of each of the at least two pixels, a potential barrier coupled to an output of the second transfer gate, and a capacitor coupled to the output of the second transfer gate. According to some such example embodiments, the readout circuit also includes a second capacitor and a switch coupled between the output of the second transfer gate and the second capacitor.

According to another example embodiment, a CCD includes four pixels with each pixel of the four pixels including a photodetector and a corresponding first transfer gate coupled to the photodetector, a second transfer gate having a single input coupled to an output of each first transfer gate of each of the four pixels, and a capacitor coupled to the output of the second transfer gate. According to some embodiments, the CCD further includes a second capacitor and a switch coupled between the output of the second transfer gate and the second capacitor. The four pixels may be arranged, for instance, in a 2×2 grid, although other grids can be used.

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

System Architecture

FIG. 1 is a block diagram of an example image sensor 100, according to some embodiments. Image sensor 100 may represent or be an integral part of a charge coupled device (CCD) camera or other type of imaging device. In some embodiments, image sensor 100 may be configured for capturing different portions of the electromagnetic spectrum, such as visible light, ultraviolet radiation, infrared radiation, or x-rays, to name a few examples. Image sensor 100 may include a pixel array 102, a column amplifier 106, an ADC 108, and a processor 110. Each of the illustrated components may be included together on same printed circuit board (PCB) or together in a single chip package (e.g., a system-in-package or system-on-chip). In some other embodiments, any one or more of the elements may be provided in a separate chip package and/or on separate PCBs.

According to some embodiments, pixel array 102 includes a plurality of pixels arranged in a row-column format. Each pixel of pixel array 102 may have a similar architecture that includes a photodetector and a transfer gate. The photo detection area of each pixel on which incident radiation may impinge may vary from one embodiment to the next, but in some example cases has a physical size of around 1 μm×1 μm up to around 5 μm×5 μm. Likewise, the shape and lensing (if present) of the photo detection area (e.g., photo diode) can also vary from one example to the next, depending on factors such as desired fill factor of the array. According to some embodiments, each row of pixels may be coupled together via a common row-select line (e.g., a wordline), to provide separately addressable rows of pixels.

As shown in the blown-out section, a group of pixels may be binned together to share a common readout circuit. In the illustrated example, four pixels in a 2×2 array have each of their transfer gates (TX1A-TX1D) coupled to a common readout circuit to read the charge from each photodetector of each of the binned pixels. As noted above, any number and arrangement of pixels on pixel array 102 can be binned together to share a common readout circuit.

According to some embodiments, the outputs from N different columns of pixels are received by column amplifier 106. According to some embodiments, column amplifier 106 represents N separate column amplifiers with a given column amplifier configured to receive the output from a corresponding column of pixels (or a corresponding column of binned pixels) from pixel array 102. In this way, a given row of pixels from pixel array 102 (or a row of binned pixels) can be selected via a row-select line and simultaneously read out via the N column amplifiers 106. According to some embodiments, column amplifier 106 may include any type of amplifier configuration, such as any number of source follower FETs or operational amplifiers. In some embodiments, a single column amplifier 106 may be used in conjunction with a multiplexer to receive each of the N column outputs from pixel array 102.

According to some embodiments, binned groups of pixels (such as the illustrated 2×2 array of pixels coupled to a common readout circuit) are arranged in rows and columns across pixel array 102. In this way, the total number of column amplifiers may be reduced as a single column amplifier may read from a given column of binned pixels as opposed to a single column of pixels.

According to some embodiments, the output(s) from column amplifier 106 is/are received by ADC 108. As noted above, ADC 108 may represent N different ADCs with a given ADC configured to receive the output from a corresponding column amplifier 106. ADC 108 may be any known type of ADC without limitation.

Processor 110 may be configured to receive the digitized signal from ADC 108 (or N digitized signals across N ADCs) and perform any number of operations with the signal(s). For example, processor 110 may receive the signal data from a given row of pixels (or row of binned pixels) of pixel array 102 and use the signal data to create an image or a portion of an image captured via pixel array 102. As used herein, the term "processor" may refer to any device or portion of a device that processes electronic data from registers and/or memory to transform that electronic data into other electronic data that may be stored in registers and/or memory. Processor 110 may include one or more digital signal processors (DSPs), application-specific integrated circuits (ASICs), central processing units (CPUs), graphics processing units (GPUs), cryptoprocessors (specialized processors that execute cryptographic algorithms within hardware), server processors, custom-built semiconductor, or any other suitable processing devices.

Binned Pixel Design

Figure 2:
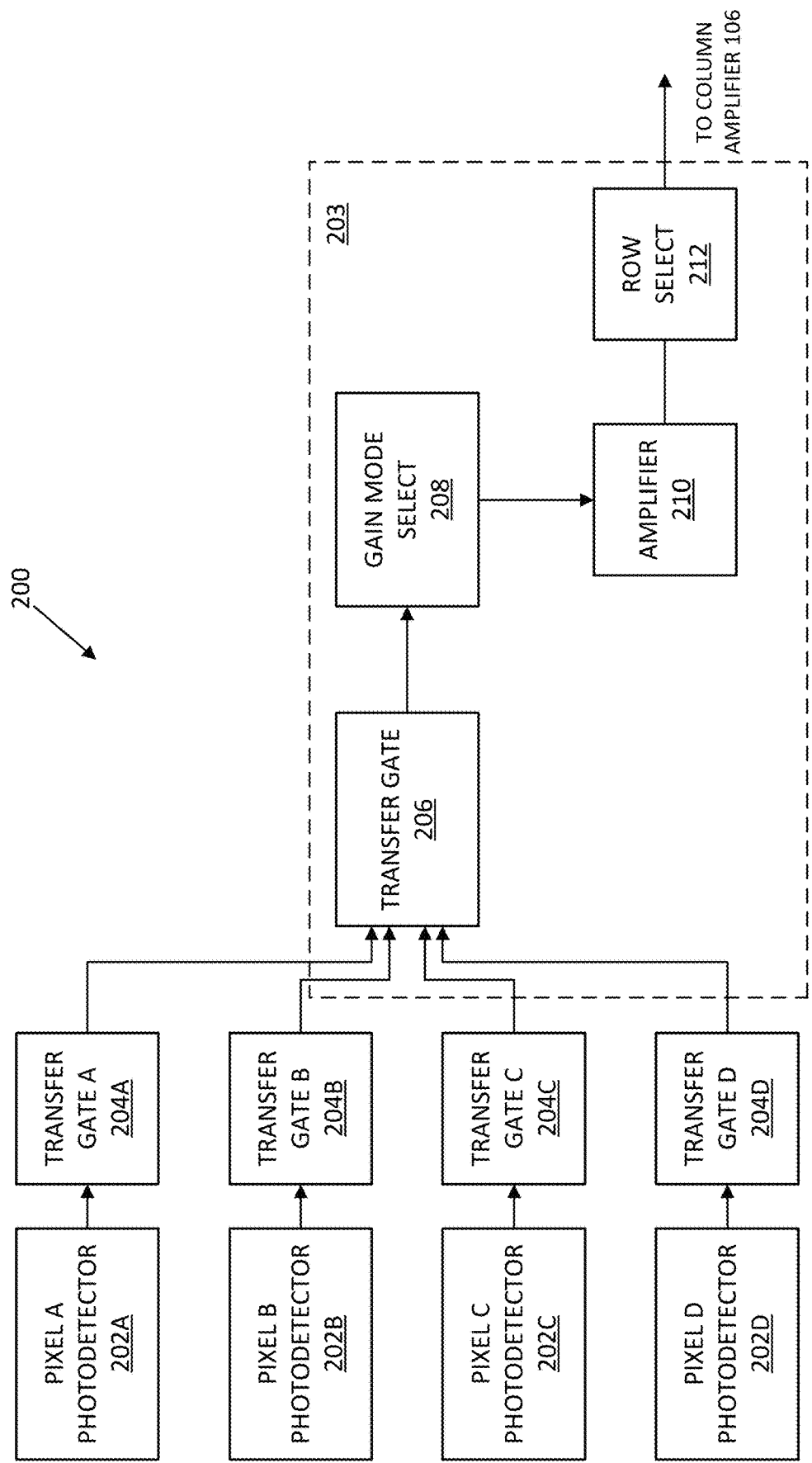
FIG. 2 is a block diagram illustrating the various components of a binned set of pixels of the pixel array of FIG. 1, in accordance with an embodiment of the present disclosure.

FIG. 2 illustrates a block diagram of a group of binned pixels 200 from pixel array 102 that includes four binned pixels with each of the four pixels coupled to a readout circuit 203, according to some embodiments. Each of the four binned pixels includes a photodetector 202A-202D and a corresponding transfer gate 204A-204D. Photodetector 202A-202D may include any type of photosensitive design, such as a PN diode. Note that the term pixel as used herein may refer to a functional pixel circuit and not just the photo detection area of a given pixel.

According to some embodiments, readout circuit 203 includes a transfer gate 206 coupled to an output of each of the transfer gates 204A-204D of the four pixels. Transfer gate 206 acts like a gatekeeper to the charge generated by any one of the photodetectors 202A-202D in response to a light input. In some embodiments, transfer gate 206 may include a single field effect transistor (FET), such as a p-doped or n-doped metal oxide semiconductor device (PMOS or NMOS). In some embodiments, a potential barrier, such as a PN diode, is coupled to an output of transfer gate 206 to allow for charge pumping via transfer gate 206.

Transfer gate 206 is configured to allow charge from any one of the photodetectors 202A-202D to pass on to gain mode select block 208, where the charge is stored across selected one or more capacitors, according to some embodiments. As described above, the active area of a given photodetector (e.g., the area which is sensitive to impinging light and generates a corresponding signal based on intensity of that light), as well as any lensing, can vary depending on the given application. Gain mode select block 208 may include one or more switches and any number of capacitors, where a state of the switches can be used to select a conversion gain mode to operate in. For example, one switch and two capacitors can be arranged to allow for two different conversion gain modes. In another example, two switches and three capacitors can be arranged to allow for three different conversion gain modes, although other layouts may include more switches and/or more capacitors to create any number of additional conversion gain modes. The charge that passes through transfer gate 206 may be stored at a given conversion gain based on which capacitors have been coupled to a sensing node within gain mode select block 208.

According to some embodiments, the sensing node from gain mode select block 208 that is coupled to selected one or more capacitors is further coupled to amplifier 210 to generate an output signal. Amplifier 210 may be implemented as a single source-follower NMOS or PMOS device, or as an operational amplifier.

According to some embodiments, a row select switch 212 is included within readout circuit 203. Row select switch 212 may have a gate or select input that is coupled to a common row-line (e.g., a wordline) with other pixels (or binned pixels) of the same row. Accordingly, when the current row is activated to read out from, row select switch 212 is activated and turned on to read out the output signal to column amplifier 106. When the current row is not selected, row select switch 212 is not active and no signal is read out to column amplifier 106. Row select switch 212 may be implemented, for example, as an NMOS or PMOS device with the row-line coupled to the gate of the NMOS or PMOS device.

Figure 3:
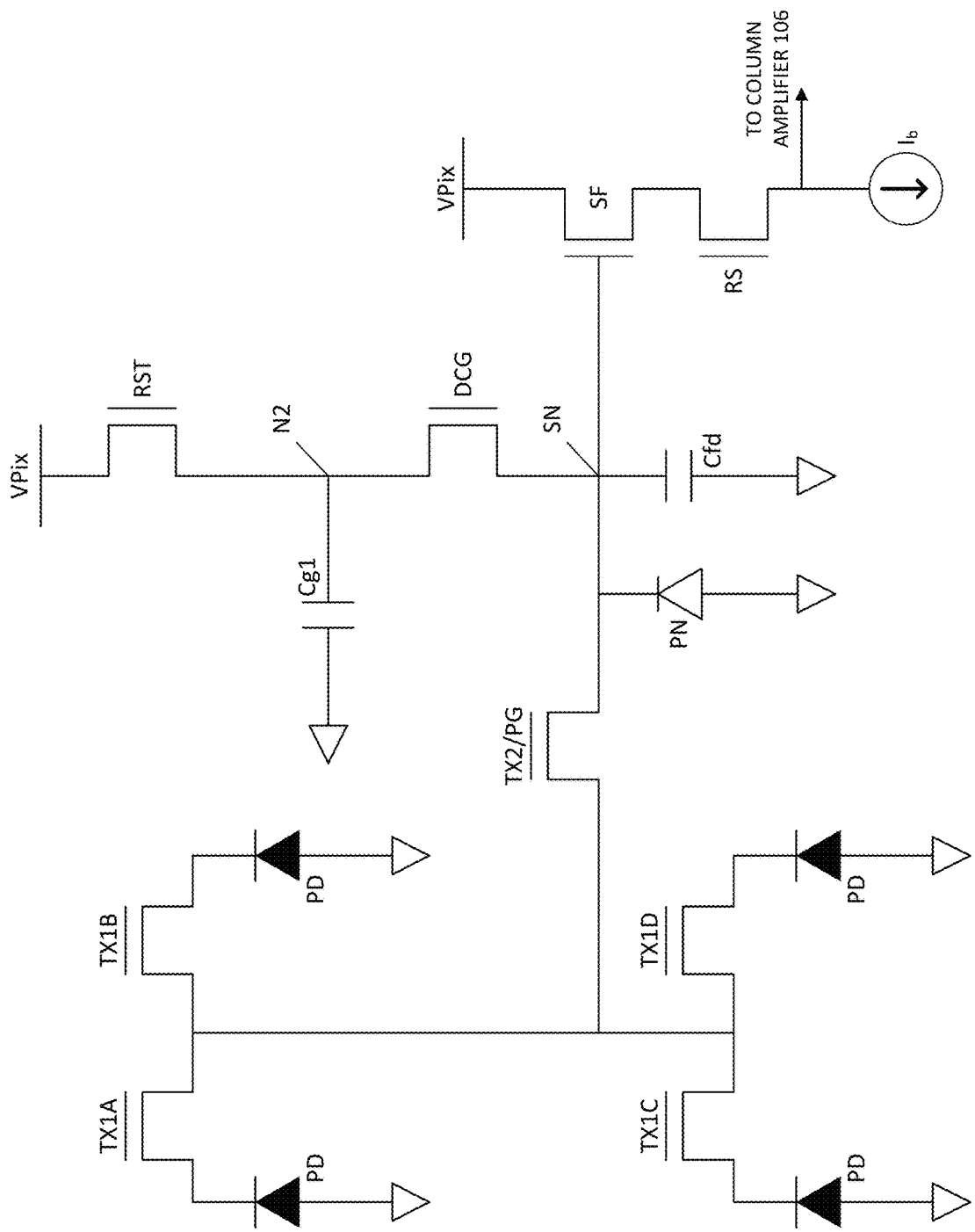
FIG. 3 is a schematic diagram illustrating the binned pixels of FIG. 2, in accordance with an embodiment of the present disclosure.

FIG. 3 illustrates an example circuit schematic of a given group of binned pixels from pixel array 102 along with a shared readout circuit, according to some embodiments. Each of the illustrated FETs may be either an NMOS or PMOS device depending on the layout. Additionally, in some embodiments, any of the FETs can be replaced with other transistor architectures, such as a bipolar junction transistor (BJT). According to some embodiments, the pixel readout circuit includes a current source $I_b$ to provide a bias current for operating a source follower amplifier SF.

According to some embodiments, four pixels have been coupled to a single transfer gate TX2 of the readout circuit. In more detail, each of the four pixels includes a photodetector PD and a first transfer gate (any of TX1A-TX1D). According to some embodiments, charge is received from only one pixel at any given time. Thus, only one of first transfer gates TX1A-TX1D may be active at any given time to access the charge from the corresponding photodetector PD.

Light impinges upon each of the photodetectors PD where it is converted into electrical charge that can flow as a photocurrent. At a given moment in time, at least a portion of the converted charge from one of the pixels is released onto a sensing node SN via its corresponding first transfer gate TX1A-TX1D and via second transfer gate TX2 by turning each of the gates on for a predefined number of clock cycles. Once the charge has been released to sensing node SN, it can be stored across various capacitors depending on the state of a switch DCG. In one example, DCG is switched off (e.g., biased off), such that the charge at sensing node SN is stored only across a first capacitor Cfd. In some examples, capacitor Cfd may have a relatively small capacitance around 1 femtofarad (fF), or between about 0.2 fF and about 3 fF. The conversion gain may be relatively high in this first configuration, such as between about 170 µV/electron and about 200 µV/electron. In another example, DCG is switched on (e.g., biased on) such that the charge at both sensing node SN and a second node N2 is stored across first capacitor Cfd in parallel with a second capacitor Cg1. In some examples, capacitor Cg1 may have a higher capacitance compared to capacitor Cfd. For example, capacitor Cg1 may have a capacitance around 10 fF, or between about 5 fF and about 15 fF. The conversion gain in this second configuration may be relatively lower than the conversion gain in the aforementioned first configuration. For example, the conversion gain in the second configuration may be between about 17 µV/electron and about 20 µV/electron.

According to some embodiments, the readout circuit may include a potential barrier (illustrated as a diode PN) coupled to sensing node SN (e.g., in parallel with capacitor Cfd). The inclusion of potential barrier PN allows for the second transfer gate TX2 to act as a pump gate PG to pump charge onto sensing node SN. According to some embodiments, a first mode of operating the readout circuit passes charge onto sensing node SN via a single charge transfer across the second transfer gate TX2 for both low and high conversion gain situations, and is illustrated in more detail with the timing diagram of FIG. 4. According to some embodiments, a second mode of operating the readout circuit passes charge onto sensing node SN via multiple pumped charge transfers across the second transfer gate TX2 (or a pump gate PG in the second operating mode) for either or both low and high conversion gain situations, and is illustrated in more detail with the timing diagram of FIG. 5.

In any of the aforementioned modes of operation, the stored potential (at the given conversion gain based on the state of switch DCG) activates the source follower amplifier SF to produce an output signal to send to column amplifier 106. Source follower amplifier SF may be a single FET device or any other amplifier structure, such as an operational amplifier. Source follower amplifier SF may be powered, for example, via rail power VPix between about 2 V and about 2.5 V or other suitable rail voltage. The output signal produced from source follower amplifier SF can only be sent on to column amplifier 106 if the row select switch RS is biased on. According to some examples, all pixels (or binned pixels) in a given row of pixel array 102 will share a same row select line (e.g., a word line) that couples with the gate of row select switch RS. If row select switch RS is biased off, then the current pixel (or binned set of pixels) is part of a row that is not currently being read from and no signal will be sent on to column amplifier 106 from the current pixel (or binned set of pixels).

According to some embodiments, the potential at any of sensing node SN or second node N2 can be reset to a baseline or reference value via a reset switch RST. When reset switch RST is biased on, the rail voltage VPix is applied to whichever nodes are coupled to the end of reset switch RST. For example, DCG can also be biased on when reset switch RST is biased on to apply voltage VPix to both sensing node SN and first node N2, thus overriding whatever charge had been there from any of the photodetectors PD. Reset switch RST is coupled to the second node N2, however, reset switch RST may be coupled to any node within the readout circuit, such as to sensing node SN.

Timing Diagrams for Various Operation Modes

Figure 4:
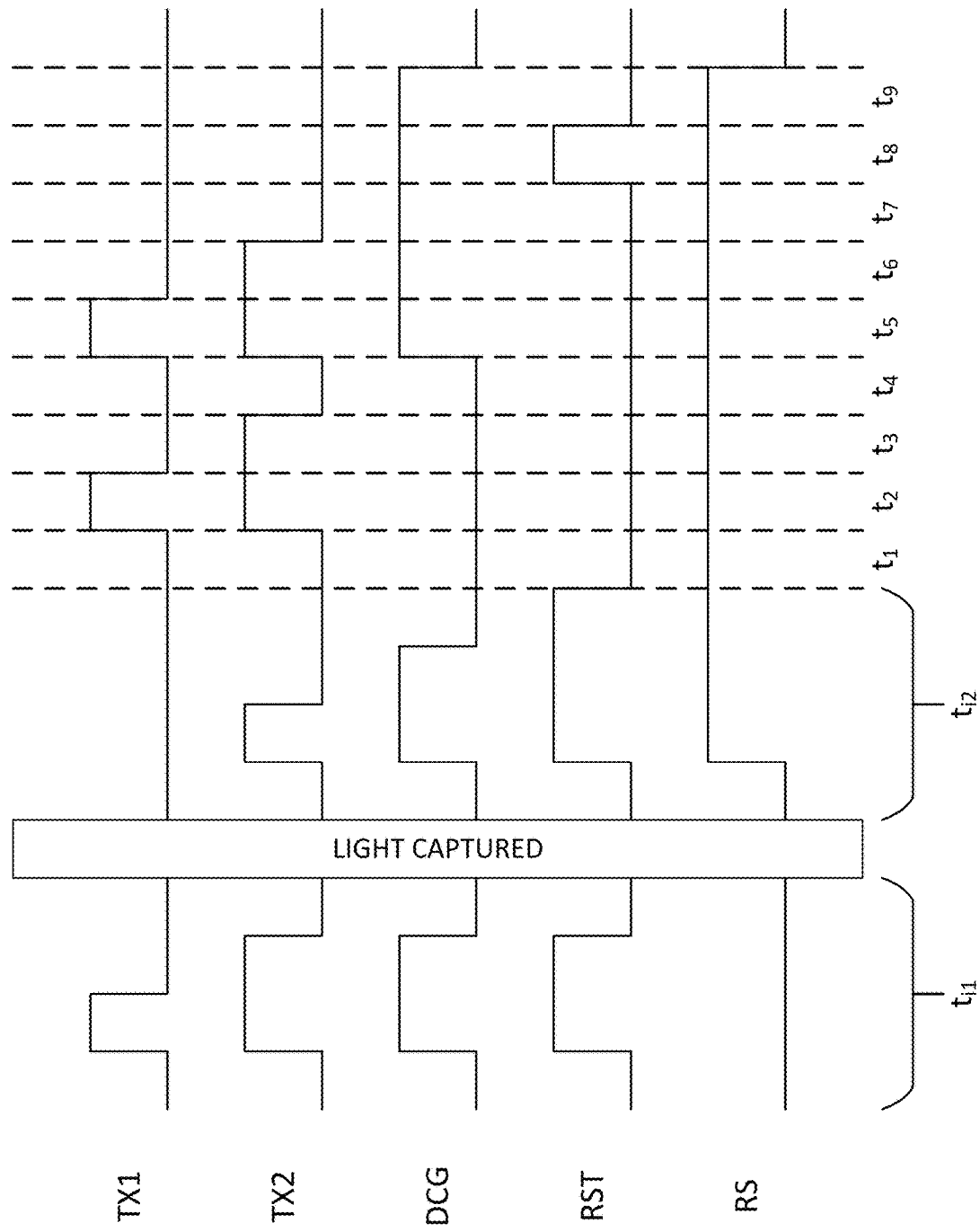
FIG. 4 is a timing diagram for various signals that control certain elements of the binned pixel circuit of FIG. 3 in a first operation mode, in accordance with an embodiment of the present disclosure.
Figure 5:
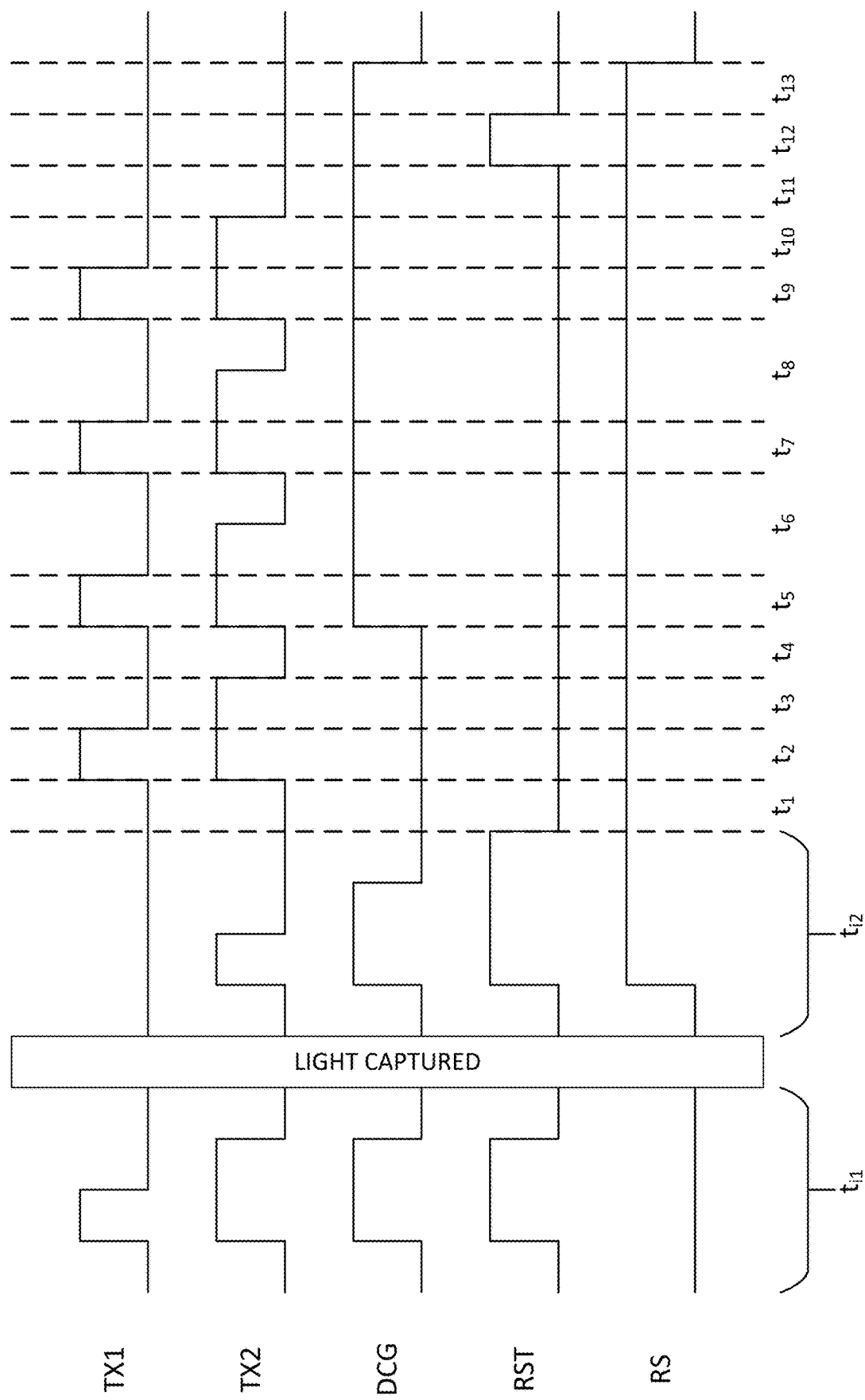
FIG. 5 is a timing diagram for various signals that control certain elements of the binned pixel circuit of FIG. 3 in a second operation mode, in accordance with an embodiment of the present disclosure.

FIGS. 4 and 5 each provide an example timing diagram for the different aforementioned operation modes of the pixel readout circuit. FIG. 4 provides an example timing diagram for the various control signals during a first operation mode (e.g., only one charge transfer occurs across the second transfer gate TX2). FIG. 5 provides an example timing diagram for the various control signals during a second operation mode (e.g., pumping charge multiple times onto sensing node SN). It should be noted that for both timing diagrams, TX1 refers to a single first transfer gate from one of the binned pixels (e.g., one of TX1A-TX1D). Thus, the various operations performed in a given timing diagram would be repeated for each other first transfer gate within the binned pixels.

For either mode of operation, a same first initialization time period Li may be used to reset the potential at various nodes around the circuit before the capturing of light occurs. During first initialization time period $t_{i1}$, RST is biased on while each of DCG, TX1, and TX2 are also biased on for at least one clock cycle. During this time, all nodes coupled to DCG, TX1, and TX2 are reset with the rail voltage VPix. According to some embodiments, the various switches are then shut off in a sequence with TX1 being biased off first, followed by DCG and TX2 being biased off together. During this process, row select RS may be biased off since no reads are occurring from the pixels during this time.

According to some embodiments, for either mode of operation, a second initialization period $t_{i2}$ may be used after light has been captured from the photodiodes of the binned pixels. During second initialization time period $t_{i2}$, RST is biased on while both DCG and TX2 are also biased on for at least one clock cycle. During this time, all nodes coupled to DCG and TX2 are reset with the rail voltage VPix. Note that unlike first initialization time period $t_0$, the nodes coupled to the photodetectors PD are not reset as these nodes now hold charge from the received light. According to some embodiments, the various switches are then shut off in a sequence with TX2 being biased off first, followed by DCG. During this process, row select RS may be biased on to begin reading baseline values from any of the nodes.

Turning to FIG. 4, after the initialization processes in the first mode of operation, row select RS continues to be biased on at a first time period $t_1$ and a baseline reading is captured of the potential at sending node SN. At a second time period $t_2$, photodetector charge is released onto sensing node SN by biasing on both TX1 and TX2. At a third time period $t_3$, TX1 is biased off but TX2 remains biased on to ensure that any photodetector charge remaining on the line between TX1 and TX2 is released onto sensing node SN. At a fourth time period $t_4$, TX2 is biased off and a reading is captured of the charge stored across capacitor Cfd from sensing node SN since DCG is biased off. Since only capacitor Cfd is used, this reading has a relatively high conversion gain. At a fifth time period $t_5$, photodetector charge is released onto both sensing node SN and second node N2 since DCG is also biased on along with both TX1 and TX2. At a sixth time period $t_6$, TX1 is biased off but TX2 remains biased on to ensure that any photodetector charge remaining on the line between TX1 and TX2 is released onto both sensing node SN and second node N2. At a seventh time period $t_7$, TX2 is biased off and a reading is captured of the charge stored across capacitor Cfd in parallel with capacitor Cg1 from sensing node SN and second node N2 since DCG is still biased on. Since capacitor Cfd in parallel with capacitor Cg1 are used, this reading has a lower conversion gain compared to the reading taken at fourth time period $t_4$. At an eighth time period $t_8$, RST is biased on to reset the potential at both sensing node SN and second node N2 back to a baseline rail voltage of VPix. At a ninth time period $t_9$, a baseline reading is captured of the potential at both sending node SN and second node N2.

According to some embodiments, the baseline readings are compared to the signal readings to capture the difference associated with the amount of light impinging upon a given one of the photodetectors PD from the binned pixels. For example, during the first mode of operation, the baseline reading captured at time period $t_1$ is compared to the signal reading captured at time period $t_4$, and the baseline reading captured at time period $t_9$ is compared to the signal reading captured at time period $t_7$.

Turning to FIG. 5, after the initialization processes in the second mode of operation, row select RS continues to be biased on at a first time period $t_1$ and a baseline reading is captured of the potential at sending node SN. At a second time period $t_2$, photodetector charge is released onto sensing node SN by biasing on both TX1 and TX2. At a third time period $t_3$, TX1 is biased off but TX2 remains biased on to ensure that any photodetector charge remaining on the line between TX1 and TX2 is released onto sensing node SN. At a fourth time period $t_4$, TX2 is biased off and a reading is captured of the charge stored across capacitor Cfd from sensing node SN since DCG is biased off. Since only capacitor Cfd is used, this reading has a relatively high conversion gain. At a fifth time period $t_5$, photodetector charge is released onto both sensing node SN and second node N2 since DCG is also biased on along with both TX1 and TX2. At a sixth time period $t_6$, TX1 is biased off but TX2 remains biased on to ensure that any photodetector charge remaining on the line between TX1 and TX2 is released onto both sensing node SN and second node N2. The operations performed between fifth time period $t_5$ and sixth time period $t_6$ to release charge onto sensing node SN and second node N2 may be considered a first charge pump operation. At a seventh time period $t_7$, photodetector charge is again released onto sensing node SN and second node N2 by biasing back on TX1 (and also biasing on both TX2 and DCG). This charge accumulates with the previously pumped charge with the help of potential barrier PN. At an eighth time period $t_8$, TX1 is biased off but TX2 remains biased on to ensure that any photodetector charge remaining on the line between TX1 and TX2 is released onto both sensing node SN and second node N2. The operations performed between seventh time period $t_7$ and eighth time period $t_8$ to release charge onto sensing node SN and second node N2 may be considered a second charge pump operation.

According to some embodiments, a third charge pump operation is performed across ninth and tenth time periods ($t_9$ and $t_{10}$) to pump more charge onto sensing node SN and second node N2. The third charge pump operations functions similarly to both the first and second charge pump operations. Any number of sequential charge pump operations may be performed in this way to continue to accumulate charge on sensing node SN and second node N2. In some embodiments, readings may be performed following any of the charge pump operations so long as RS is biased on.

At an eleventh time period $t_{11}$, the final pump operation has completed and a reading is captured of the charge stored across capacitor Cfd in parallel with capacitor Cg1 from sensing node SN and second node N2 since DCG is still biased on. Since capacitor Cfd in parallel with capacitor Cg1 are used, this reading has a lower conversion gain compared to the reading taken at fourth time period $t_4$. Due to the pumping operations, more charge may be present across sensing node SN and second node N2 to help compensate for the lower conversion gain. At a twelfth time period $t_{12}$, RST is biased on to reset the potential at both sensing node SN and second node N2 back to a baseline rail voltage of VPix. At a thirteenth time period $t_{13}$, a baseline reading is captured of the potential at both sending node SN and second node N2.

According to some embodiments, the baseline readings are compared to the signal readings to capture the difference associated with the amount of light impinging upon a given one of the photodetectors PD from the binned pixels. For example, during the second mode of operation, the baseline reading captured at time period $t_1$ is compared to the signal reading captured at time period $t_4$, and the baseline reading captured at time period $t_{13}$ is compared to the signal reading captured at time period $t_{11}$.

Example Computing Platform

Figure 6:
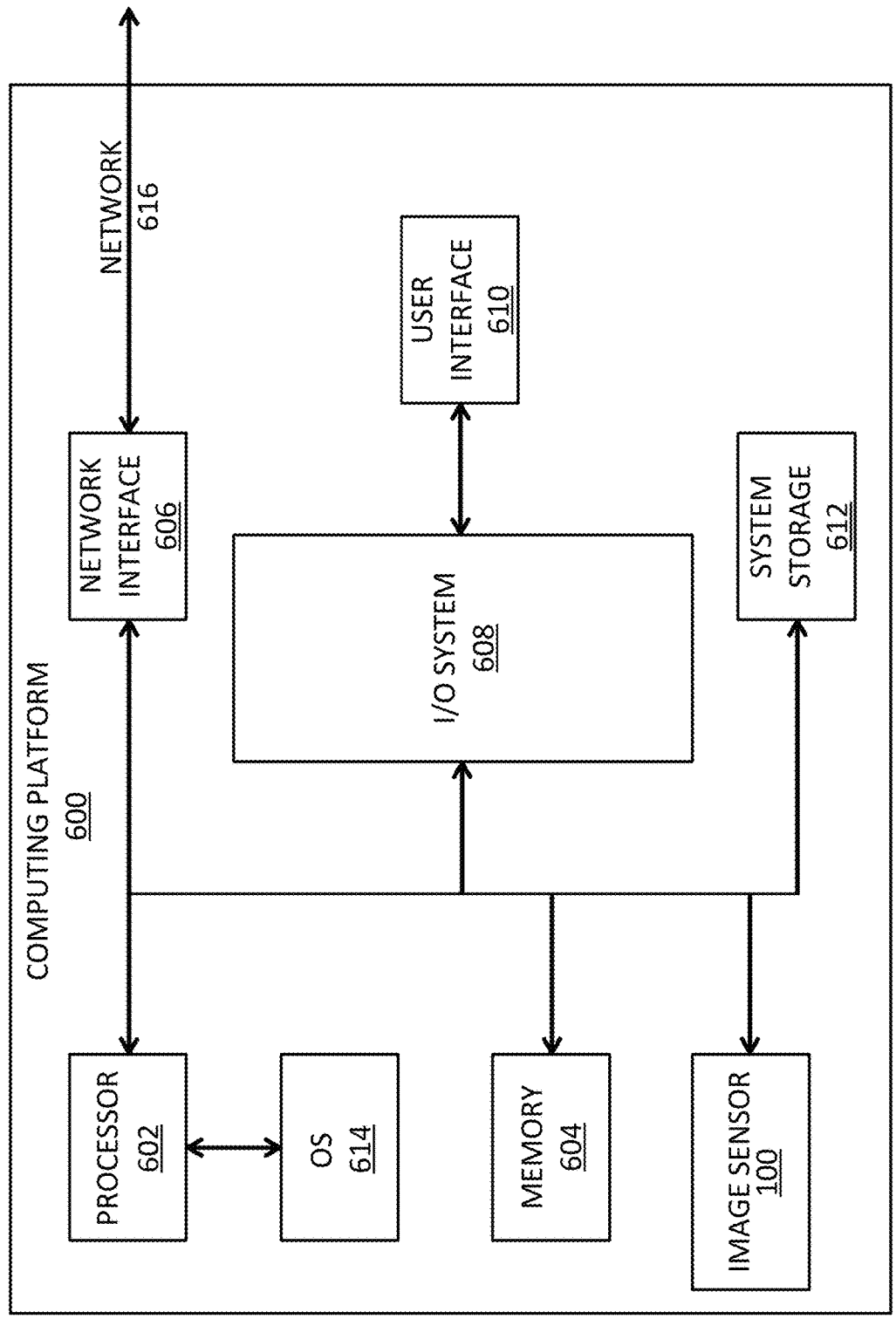
FIG. 6 illustrates an example computing platform that may include the image sensor of FIG. 1, in accordance with an embodiment of the present disclosure.

FIG. 6 illustrates an example computing platform 600 that interfaces with image sensor 100, configured in accordance with certain embodiments of the present disclosure. In some embodiments, computing platform 600 may host, or otherwise be incorporated into a personal computer, workstation, server system, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile internet device (MID), messaging device, data communication device, imaging device, wearable device, embedded system, and so forth. Any combination of different devices may be used in certain embodiments. Computing platform 600 may host a controlled area network (CAN) used on board a vehicle. In some embodiments, computing platform 600 represents one system in a network of systems coupled together via a CAN bus.

In some embodiments, computing platform 600 may comprise any combination of a processor 602, a memory 604, image sensor 100, a network interface 606, an input/output (I/O) system 608, a user interface 610, and a storage system 612. In some embodiments, one or more components of image sensor 100 are implemented as part of processor 602. As can be further seen, a bus and/or interconnect is also provided to allow for communication between the various components listed above and/or other components not shown. Computing platform 600 can be coupled to a network 616 through network interface 606 to allow for communications with other computing devices, platforms, or resources. Other componentry and functionality not reflected in the block diagram of FIG. 6 will be apparent in light of this disclosure, and it will be appreciated that other embodiments are not limited to any particular hardware configuration.

Processor 602 can be any suitable processor and may include one or more coprocessors or controllers to assist in control and processing operations associated with computing platform 600. In some embodiments, processor 602 may be implemented as any number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core.

Memory 604 can be implemented using any suitable type of digital storage including, for example, flash memory and/or random access memory (RAM). In some embodiments, memory 604 may include various layers of memory hierarchy and/or memory caches as are known to those of skill in the art. Memory 604 may be implemented as a volatile memory device such as, but not limited to, a RAM, dynamic RAM (DRAM), or static RAM (SRAM) device. Storage system 612 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage system 612 may comprise technology to increase the storage performance enhanced protection for valuable digital media when multiple hard drives are included.

Processor 602 may be configured to execute an Operating System (OS) 614 which may comprise any suitable operating system, such as Google Android (Google Inc., Mountain View, CA), Microsoft Windows (Microsoft Corp., Redmond, WA), Apple OS X (Apple Inc., Cupertino, CA), Linux, or a real-time operating system (RTOS). As will be appreciated in light of this disclosure, the techniques provided herein can be implemented without regard to the particular operating system provided in conjunction with computing platform 600, and therefore may also be implemented using any suitable existing or subsequently-developed platform.

Network interface 606 can be any appropriate network chip or chipset which allows for wired and/or wireless connection between other components of computing platform 600 and/or network 616, thereby enabling computing platform 600 to communicate with other local and/or remote computing systems, servers, cloud-based servers, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 608 may be configured to interface between various I/O devices and other components of computing platform 600. I/O devices may include, but not be limited to, a user interface 610. User interface 610 may include devices (not shown) such as a display element, touchpad, keyboard, mouse, and speaker, etc. I/O system 608 may include a graphics subsystem configured to perform processing of images for rendering on a display element. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 602 or any chipset of computing platform 600.

It will be appreciated that in some embodiments, the various components of the computing platform 600 may be combined or integrated in a system-on-a-chip (SoC) architecture. In some embodiments, the components may be hardware components, firmware components, software components or any suitable combination of hardware, firmware or software.

In various embodiments, computing platform 600 may be implemented as a wireless system, a wired system, or a combination of both. When implemented as a wireless system, computing platform 600 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, computing platform 600 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software executed by a programmable control device. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, GPUs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Further Example Embodiments

The following examples pertain to further embodiments, from which numerous permutations and configurations will be apparent.

Example 1 is a charge coupled device (CCD) that includes a first pixel and a second pixel. Each of the first and second pixels including a photodetector and a corresponding first transfer gate coupled to the photodetector. The CCD also includes a second transfer gate having an input coupled to an output of each first transfer gate of the first and second pixels, a potential barrier coupled to an output of the second transfer gate, and a capacitor coupled to the output of the second transfer gate.

Example 2 includes the CCD of Example 1, wherein the corresponding first transfer gate of each of the first and second pixels is a field effect transistor (FET).

Example 3 includes the CCD of Example 1 or 2, wherein the capacitor is a first capacitor and the CCD comprises a second capacitor and a switch coupled between the output of the second transfer gate and the second capacitor.

Example 4 includes the CCD of Example 3, wherein the second capacitor has a higher capacitance than the first capacitor.

Example 5 includes the CCD of Example 3 or 4, further comprising a reset switch coupled to a shared node between the switch and the second capacitor.

Example 6 includes the CCD of any one of Examples 1-5, wherein the potential barrier is a PN diode.

Example 7 includes the CCD of any one of Examples 1-6, wherein the output of the second transfer gate is coupled to a gate of a FET.

Example 8 includes the CCD of any one of Examples 1-7, wherein the first and second pixels are arranged in a 2×2 grid that comprises four pixels.

Example 9 is an image sensor that includes a pixel array having at least one column of addressable pixels, a readout circuit, a column amplifier coupled to the readout circuit, an analog-to-digital converter (ADC) coupled to the column amplifier, and a processor coupled to the ADC. The at least one column of addressable pixels includes at least two pixels with each pixel of the at least two pixels including a photodetector and a corresponding first transfer gate coupled to the photodetector. The readout circuit includes a second transfer gate having an input coupled to an output of each first transfer gate of the at least two pixels, a potential barrier coupled to an output of the second transfer gate, and a capacitor coupled to the output of the second transfer gate.

Example 10 includes the image sensor of Example 9, wherein the corresponding first transfer gate of each of the at least two pixels is a field effect transistor (FET).

Example 11 includes the image sensor of Example 9 or 10, wherein the capacitor is a first capacitor and the readout circuit comprises a second capacitor and a switch coupled between the output of the second transfer gate and the second capacitor.

Example 12 includes the image sensor of Example 11, wherein the second capacitor has a higher capacitance than the first capacitor.

Example 13 includes the image sensor of Example 11 or 12, wherein the readout circuit further comprises a reset switch coupled to a shared node between the switch and the second capacitor.

Example 14 includes the image sensor of any one of Examples 9-13, wherein the potential barrier is a PN diode.

Example 15 includes the image sensor of any one of Examples 9-14, wherein the output of the second transfer gate is coupled to a gate of a FET.

Example 16 includes the image sensor of any one of Examples 9-15, wherein the at least two pixels comprises four pixels arranged in a 2×2 grid.

Example 17 is a charge coupled device (CCD) that includes four pixels with each pixel of the four pixels including a photodetector and a corresponding first transfer gate coupled to the photodetector, a second transfer gate having a single input coupled to an output of each first transfer gate of each of the four pixels, and a capacitor coupled to the output of the second transfer gate.

Example 18 includes the CCD of Example 17, wherein the corresponding first transfer gate of each of the four pixels is a field effect transistor (FET).

Example 19 includes the CCD of Example 17 or 18, wherein the capacitor is a first capacitor and the CCD comprises a second capacitor and a switch coupled between the output of the second transfer gate and the second capacitor.

Example 20 includes the CCD of Example 19, wherein the second capacitor has a higher capacitance than the first capacitor.

Example 21 includes the CCD of Example 19 or 20, further comprising a reset switch coupled to a shared node between the switch and the second capacitor.

Example 22 includes the CCD of any one of Examples 17-21, wherein the second transfer gate is a FET.

Example 23 includes the CCD of any one of Examples 17-22, wherein the output of the second transfer gate is coupled to a gate of a FET.

Example 24 includes the CCD of any one of Examples 17-23, wherein the four pixels are arranged in a 2×2 grid.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

What is claimed is:

1. A charge coupled device (CCD), comprising:
    a first pixel and a second pixel, with each of the first and second pixels including a photodetector and a corresponding first transfer gate coupled to the photodetector;
    a second transfer gate having an input coupled to an output of each first transfer gate of the first and second pixels;
    a potential barrier coupled to an output of the second transfer gate; and
    a capacitor coupled to the output of the second transfer gate;
    wherein the capacitor is a first capacitor and the CCD comprises a second capacitor and a switch coupled between the output of the second transfer gate and the second capacitor; and
    wherein the second capacitor has a higher capacitance than the first capacitor.

2. The CCD of claim 1, wherein the corresponding first transfer gate of each of the first and second pixels is a field effect transistor (FET).

3. The CCD of claim 1, further comprising a reset switch coupled to a shared node between the switch and the second capacitor.

4. The CCD of claim 1, wherein the potential barrier is a PN diode.

5. The CCD of claim 1, wherein the output of the second transfer gate is coupled to a gate of a FET.

6. The CCD of claim 1, wherein the first and second pixels are arranged in a 2×2 grid that comprises four pixels.

7. An image sensor, comprising:
- a pixel array having at least one column of addressable pixels, wherein the at least one column of addressable pixels includes at least two pixels with each pixel of the at least two pixels including a photodetector and a corresponding first transfer gate coupled to the photodetector;
- a readout circuit;
- a column amplifier coupled to the readout circuit;
- an analog-to-digital converter (ADC) coupled to the column amplifier; and
- a processor coupled to the ADC;
- wherein the readout circuit comprises
  - a second transfer gate having an input coupled to an output of each first transfer gate of each of the at least two pixels,
  - a potential barrier coupled to an output of the second transfer gate, and
  - a capacitor coupled to the output of the second transfer gate;
- wherein the capacitor is a first capacitor and the readout circuit comprises a second capacitor and a switch coupled between the output of the second transfer gate and the second capacitor; and
- wherein the second capacitor has a higher capacitance than the first capacitor.

8. The image sensor of claim 7, wherein the readout circuit further comprises a reset switch coupled to a shared node between the switch and the second capacitor.

9. The image sensor of claim 7, wherein the potential barrier is a PN diode.

10. The image sensor of claim 7, wherein the at least two pixels comprises four pixels arranged in a 2×2 grid.

11. A charge coupled device (CCD), comprising:
- four pixels with each pixel of the four pixels including a photodetector and a corresponding first transfer gate coupled to the photodetector;
- a second transfer gate having a single input coupled to an output of each first transfer gate of each of the four pixels; and
- a capacitor coupled to the output of the second transfer gate;
- wherein the capacitor is a first capacitor and the CCD comprises a second capacitor and a switch coupled between the output of the second transfer gate and the second capacitor; and
- wherein the second capacitor has a higher capacitance than the first capacitor.

12. The CCD of claim 11, further comprising a reset switch coupled to a shared node between the switch and the second capacitor.

13. The CCD of claim 11, wherein the output of the second transfer gate is coupled to a gate of a FET.

14. The CCD of claim 11, wherein the four pixels are arranged in a 2×2 grid.

* * * * *